United States Patent [19]
Takarabe et al.

[11] Patent Number: 5,948,252
[45] Date of Patent: Sep. 7, 1999

[54] FILTERING DEVICE

[75] Inventors: Takasi Takarabe, Yokohama; Hironobu Nakatani, Tokyo, both of Japan

[73] Assignee: Takara Industries Co., Ltd., Tokyo, Japan

[21] Appl. No.: 08/824,518

[22] Filed: Mar. 26, 1997

[30] Foreign Application Priority Data

Mar. 28, 1996 [JP] Japan .................................. 8-111058
Aug. 8, 1996 [JP] Japan .................................. 8-239644

[51] Int. Cl.$^6$ ................................................. B01D 24/32
[52] U.S. Cl. ...................... 210/267; 210/276; 210/279; 210/291; 210/403
[58] Field of Search ................................ 210/267, 275, 210/276, 279, 282, 285, 288, 289, 291, 402–404

[56] References Cited

U.S. PATENT DOCUMENTS

| 279,226 | 6/1883 | Crocker ................................... 210/267 |
| 559,816 | 5/1896 | Scowden ................................. 210/267 |
| 873,458 | 12/1907 | Reeves et al. ......................... 210/267 |
| 3,606,947 | 9/1971 | Tanaka et al. ......................... 210/403 |
| 4,379,750 | 4/1983 | Tiggelbeck .............................. 210/289 |
| 4,556,487 | 12/1985 | Ueda ....................................... 210/267 |
| 5,518,614 | 5/1996 | Zittel ...................................... 210/403 |

FOREIGN PATENT DOCUMENTS 61-41246 of 1986 Japan .
7-17131 of 1993 Japan .
2 141 039 of 1984 United Kingdom .

*Primary Examiner*—Thomas G. Wyse
*Attorney, Agent, or Firm*—Gary M. Nath; Nath & Associates

[57] ABSTRACT

A filtering device provided a horizontal drum in which a filter layer made of granular filter material and a space portion are formed in a vertical direction within its interior; a crude water introducing/dirty water discharging first water flow pipe which passes through an axial portion of the horizontal drum from the outside of the horizontal drum and whose a crude water introducing/dirty water discharging first water flow portion is located in the space portion; and a filtered water introducing/washing water discharging second water flow pipe which passes through an axial portion of the horizontal drum from the outside of the horizontal drum and whose a filtered water introducing/washing water discharging second water flow portion is located in an interior of the filter layer. A planar filter mesh which is rotated together with the horizontal drum and which is in communication with the filtered water introducing/washing water discharging second water flow portion is additionally provided in the interior of the filter layer.

20 Claims, 13 Drawing Sheets

FILTERING DEVICE

BACKGROUND OF THE INVENTION

1. Field of the Invention

The present invention relates to a filtering device having a filter washing capability, and more specifically to a filtering device having the self-cleaning function and the alga or seaweed adhesive preventing function during the rotation of the drum.

2. Description of the Related Art

There have been proposed various filtering devices such as a filtering device in which washing water is jetted against a filter layer to wash the filtering material, another device in which air is compressed and fed together with reverse washing water from a bottom of a filter bed and is stirred to wash the filter material, and the like. However, the conventional devices suffer from defects that the filter material cannot sufficiently be washed, it takes a large amount of washing water and a long time to wash the filter material, and the filtering mechanism is complicated and become large in size.

Accordingly, in view of the foregoing defects, the present inventors have proposed a filtering device in which the filter material may be well washed, the filtering mechanism may be simplified and may become small in size, and the filtering capability is enhanced (Japanese Examined Patent Publication No. 61-41246, British Patent Publication No. 2141039A and U.S. Pat. No. 4,556,487).

As shown in FIG. 11, in this device, a filter layer 101 composed of granular filter material and a space 102 are formed in the interior in the vertical direction. The device includes a rotatable horizontal drum 103, a crude water introducing/dirty water discharging first water flow pipe 105 which passes a central portion of the horizontal drum 103 in the axial direct on from the outside of the horizontal drum 103 and which has a crude water introducing/dirty water discharging first water flow portion 104 located in the space 102, and a filtered water introducing/washing water discharging second water flow pipe 107 which passes the central portion of the horizontal drum 103 in the axial direction from the outside of the horizontal drum 103 and which has a filtered water introducing/washing water discharge second water flow portion 106 located within the filter layer 101.

The above-described first and second water flow pipes 105 and 107 are securely fixed to a support frame 108 so as not to rotate when the horizontal drum 103 rotates. These pipes extend to the interior of the drum 103 and pass through the central portion of the drum 103 in the diametrically opposite direction. The drum 103 is driven by a drive force of the motor (not shown) around the stationary shafts of the parts of the first water flow pipe 105 and the second water flow pipe 107 extending along a rotary axis. Also, the parts of the first water flow pipe 105 and the second water flow pipe 107 extending along the rotary axis are integrally formed with each other by using a single pipe member. The midway portion of the pipe member is partitioned by a partitioning member 109 to form the first water flow pipe 105 and the second water flow pipe 107. In the second water flow portion 106 of the second water flow pipe 107, a portion 111 where second water flow ports 110 are formed is surrounded by a filter mesh 112, a sliding contact member 113 which is brought into sliding contact with the inner surface of the filter mesh 112 when the filter material is washed are provided between the filter mesh 112 and the portion 111. The sliding contact member 113 is formed by a helical linear member wound around a portion 111 where the second water flow ports 110 are formed. The second water flow portion 106, the filter mesh 112 and the sliding contact member 113 form a strainer S. An agitating member 114 for assisting the movement of the granular filter material when the drum 103 is rotated is provided on the inner circumferential surface of the horizontal drum 103.

Also, as shown in Japanese Patent Application Laid-Open No. Hei 7-171313, there is another approach in which the filter space portion is formed by dividing the interior of a rotary member into three in the vertical direction by partitioning plates having water flow apertures, and the granular filter material is provided to be movable within the filter space portion in accordance with the rotation of the rotary member. However, this simply means the device in which the interior of the rotary member is divided into three in the vertical direction by the partitioning plates having the water flow apertures. This does not mean the intent to positively utilize the function of the strainer.

Turning back to the conventional device shown in FIG. 11, since the area of the strainer may only be formed to the limited portion, the area for the filtering function is small and its efficiency is low. In addition, it takes a long time to perform the opposite washing. This leads to the consumption of a large amount of washing water. Also, in the fixed strainer, a friction with the granular filter material is increased. However, on the other hand, its damage or flaw is remarkable. This means the difficulty in maintenance work such as replacement.

SUMMARY OF THE INVENTION

In order to overcome the above-noted defects, according to a first aspect of the invention, there is provided a filtering device comprising:

a horizontal drum in which a filter layer made of granular filter material and a space portion are formed in a vertical direction within its interior;

a crude water introducing/dirty water discharging first water flow pipe which passes through an axial portion of the horizontal drum from the outside of the horizontal drum and whose a crude water introducing/dirty water discharging first water flow portion is located in the space portion; and a filtered water introducing/washing water discharging second water flow pipe which passes through an axial portion of the horizontal drum from the outside of the horizontal drum and whose a filtered water introducing/washing water discharging second water flow portion is located in an interior of the filter layer;

wherein a planar filter mesh which is rotated together with the horizontal drum and which is in communication with the filtered water introducing/washing water discharging second water flow portion is additionally provided in the interior of the filter layer.

According to a second aspect of the invention, there is provided a filtering device comprising:

a horizontal drum in which a filter layer made of granular filter material and a space portion are formed in a vertical direction within its interior;

a crude water introducing/dirty water discharging first water flow pipe which passes from an axial portion of the horizontal drum from the outside of the horizontal drum and whose a crude water introducing/dirty water discharging first water flow portion is located in the space portion; and a filtered water introducing/washing water discharging second water flow pipe which passes through an axial portion of the horizontal drum from the outside of the horizontal drum and whose a filtered water introducing/ washing water discharging second water flow portion is located in an interior of the filter layer;

wherein a planar filter mesh which is rotated together with the horizontal drum and which is in communication with the filtered water introducing/washing water discharging second water flow portion is additionally provided in the interior of the filter layer and in the space portion, and a planar filter mesh which is in communication with the crude water introducing/ washing water discharging first water flow pipe is additionally provided in the space portion.

According to a third aspect of the invention, at least one of the crude water introducing/dirty water discharging first water pipe and the filtered water introducing/washing water discharging second water pipe is arranged outside of the horizontal drum, and at least one of the crude water introducing/dirty water discharging first water flow portion which is located within the filter layer through a pipe and the filtered water introducing/washing water discharging second water flow portion is in communication with each other.

According to a fourth aspect of the invention, the planar filter mesh is detachably mounted on the horizontal drum.

According to a fifth aspect of the invention, the planar filter mesh is provided on an inner surface of a cover and detachably mounted together with the cover.

According to a sixth aspect of the invention, the filter mesh 8 comprises a wedge wire composed of a number of slits formed in the substantially planar plate by slits.

According to a seventh aspect of the invention, a rotation of the horizontal drum of the filtering device is made into a swing motion.

According to an eighth aspect of the invention, the filtering device may further comprise a means for cleaning a back surface of the filter mesh and for preventing adhesives such as an alga or seaweed from adhering to the back surface, the means following the rotation of the drum and provided between the filter mesh and an inner wall of the drum.

According to a ninth aspect of the invention, the means for cleaning a back surface of the filter mesh and for preventing adhesives such as an alga or seaweed from adhering to the back surface comprises a number of brushes implanted in a single plate.

According to a tenth aspect of the invention, the means for cleaning a back surface of the filter mesh and for preventing adhesives such as an alga or seaweed from adhering to the back surface comprises at least one rotary brush.

According to an eleventh aspect of the invention, the means for cleaning a back surface of the filter mesh and for preventing adhesives such as an alga or seaweed from adhering to the back surface comprises a number of sliding ingots.

According to a twelfth aspect of the invention, the means for cleaning a back surface of the filter mesh and for preventing adhesives such as an alga or seaweed from adhering to the back surface has a mixture of a dust preventing agent or the like and a coating of the dust prevent agent or the like.

According to a thirteenth aspect of the invention, the dust preventing agents or the like are mixed or coated with the planar filter mesh.

Accordingly, first, since the filter mesh area is increased, the filter efficiency is enhanced, and the horizontal drum is rotated during the reverse washing operation, the filter material is sliding rubbed together so that there is no strain. In spite of the fact, it is possible to break the dirt or dirty matters adhered to the filter mesh by the movement of the filter material and to separate the dirt away from the filter mesh. In comparison with the conventional stationary type filtering device, the washing water may be saved by about one tenth of that for the conventional filtering device, and at the same time, it is possible to wash the filter mesh for a short period of time.

Second, in addition to the first effect, since the filter mesh is provided between the filter layer and the space portion, the synergetic effect of the rough filtering through the space portion, and the filtering through the filter layer where the filtering effect in the space portion could not sufficiently be performed may be obtained. The filtering efficiency is enhanced. It is possible to provide a filtering device in which during the washing operation, the adhesives may automatically be washed out.

Third, in addition to the first and/or second effect, since at least one of the crude water introducing/dirty water discharging water flow pipe and the filtered water introducing/ washing water discharging second water flow pipe is arranged outside of the horizontal drum, the dead space is not formed within the drum, and a part or all of the one may become the filter layer. Thus, it is possible to make the horizontal drum to such an extent.

Fourth, in addition to any one of the foregoing first to third effects, since the filter mesh may readily be replaced by new one, the application of the filter mesh in response to the degree of contamination or cleanliness of the filter mesh or the repair of the mesh may readily be attained.

Fifth, in addition to any one of the foregoing first to fourth effects, since the filter mesh is provided on the inner surface of the cover and may be replaced together with the cover, it is easy for any one to replace the filter meshes with great ease. The application of the filter mesh in response to the degree of contamination or cleanliness of the filter mesh or the repair of the mesh may more readily be attained.

Sixth, in addition to any one of the foregoing first to fifth effects, since the filter mesh is composed of a wedge wire, the dirty matters collected by the mesh may readily be substantially completely removed without damaging the granular filter material and the sliding rubbing between the inner wall of the drum and the granular filter material may smoothly be performed.

Seventh, in addition to any one of the foregoing first to sixth effects, since the rotational manner of the horizontal drum may be of a swing motion type, the drum is swung in the range where the filter material and the filter mesh are rubbed with each other. It is possible to remove the dirty substance without any difficulty. This leads to the saving of the drive power.

Eighth, in addition to any one of the foregoing first to seventh effects, since the filtering device has a dirt adhesion preventing device for the alga or seaweed and a self-cleaning function for the back surface of the filter mesh even during the filtering operation between the planar filter mesh and the inner wall of the drum, the self-cleaning function and the alga or seaweed adhesive preventing function are available to prevent the dirt or alga from adhering to the back surface of the filter mesh through the sliding movement in accordance with the rotation of the drum. Even if the dirt or the like adheres to the back surface, the dirt is removed so that the dirt may be automatically discharged together with the washing water to the outside.

Ninth to eleventh, in addition to any one of the foregoing first to eighth effects, the filtering device has a simple back surface self-washing structure which may prevent the alga or seaweed from adhering to the back surface to thereby prevent the generation of mold. Even if the dirt or the like adheres to the back surface, the dirt or the like may be removed.

Twelfth, in addition to any one of the foregoing first to eleventh effects, since the adhesive preventing means is mixed or coated with the dust preventing agents, the filtering device always may keep in a clean condition.

Thirteenth, in addition to any one of the foregoing first to twelfth effects, only by mixing or coating the dust preventing agents to the filter mesh, it is possible to provide a filtering device which may dispense with the cleaning of the back surface of the filter mesh for a long period of time and may remove the means for preventing the alga or seaweed from adhering to the back surface in a more positive manner.

DESCRIPTION OF THE PREFERRED EMBODIMENTS

Figure 1:
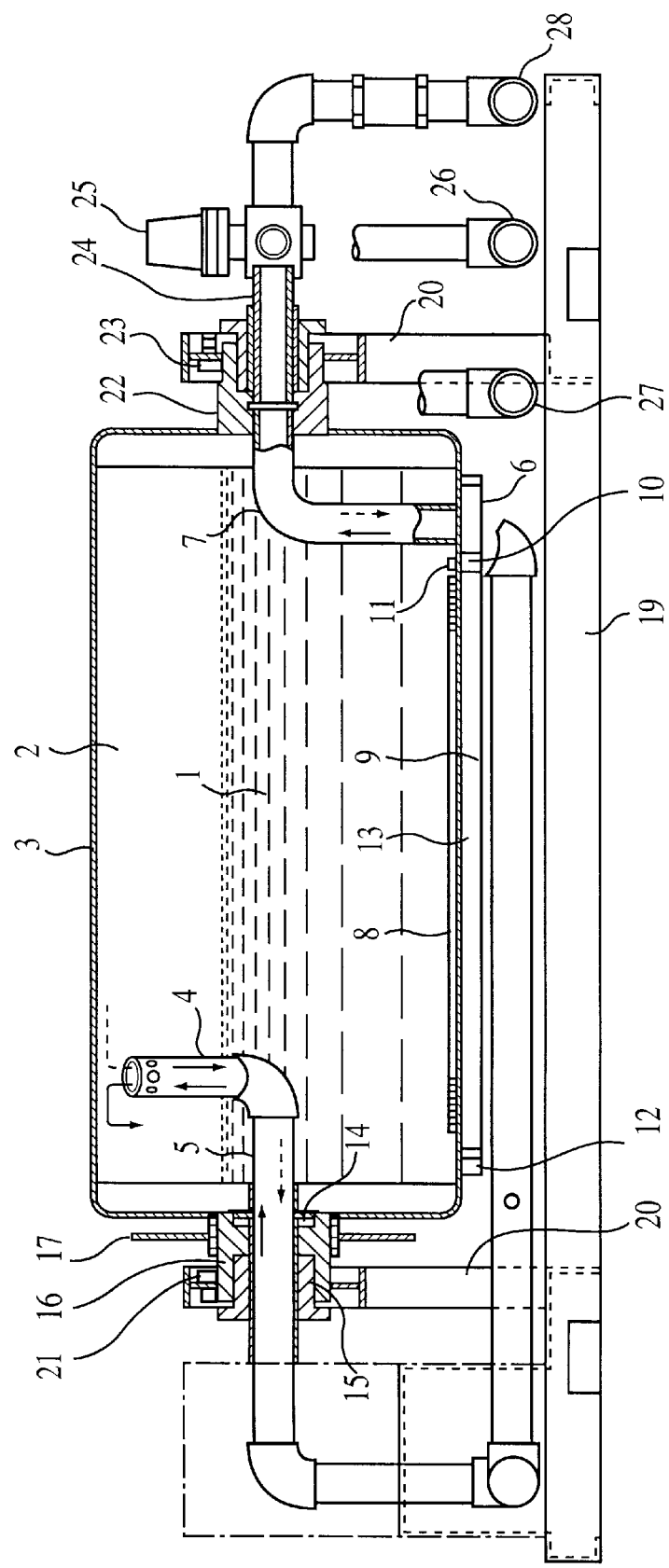
FIG. 1 is a longitudinal sectional view showing a filtering device according to a first embodiment of the invention.
Figure 2:
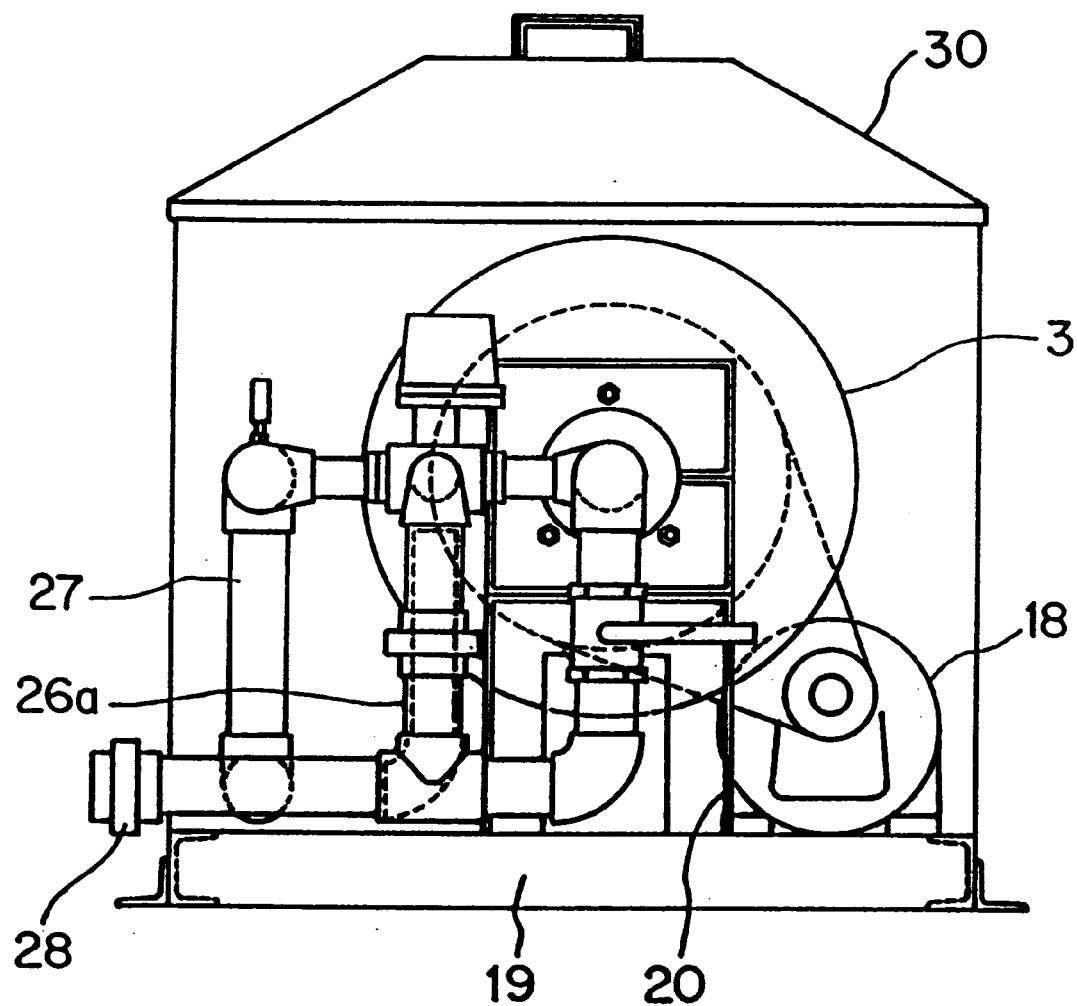
FIG. 2 is a right side elevational view showing the filtering device shown in FIG. 1.
Figure 3:
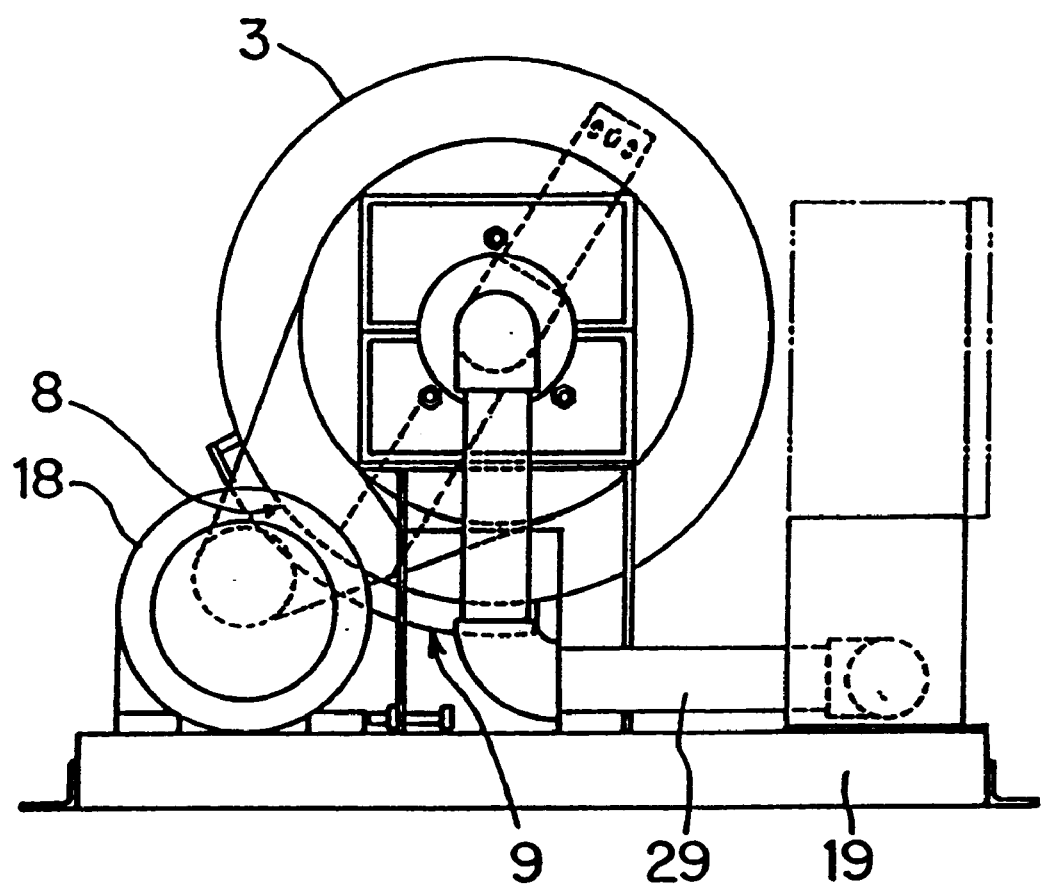
FIG. 3 is a left side elevational view showing the filtering device shown in FIG. 1.

A filtering device according to a first embodiment of the present invention will now be described with reference to the accompanying drawings. As shown in FIGS. 1 to 3, a filtering device includes a horizontal drum 3 in which a filter layer filled with granular filter material and a space 2 are formed in the vertical direction, a first water flow pipe 5 for introducing the crude water and discharging dirty water, which passes through an axial center portion of the horizontal drum 3 from the outside, and in which a first water flow portion 4 for introducing crude water and discharging dirty water is located in a hollow space 2, and a second water flow pipe 7 for introducing the crude water and discharging dirty water, which passes through an axial center portion of the horizontal drum 3 from the outside, and in which a second water flow portion 6 for introducing crude water and discharging dirty water is located in the filter layer 1. In such a filtering device, various kinds of filter meshes 8 (for example, metal meshes, porous plates made of metal or synthetic resin, or the like) are directly fixed within the filter layer 1 of the horizontal drum 3, or indirectly to flange by welding or adhesives. Otherwise, preferably, they are fixed, by welding, to almost all the surface of the inner surface of a cover 9 through a rectangular frame member or flange 10 provided at the four corner portions of the cover 9. Alternatively, the meshes are detachably provided within the filter layer 1 or the inner surface of the cover 9 by bolts and nuts 11. The filter meshes 8 are substantially flush with the inner surface of the horizontal drum 3 by the rectangular frame member or flange 10. The gap 13 between the filter meshes 8 and the cover 9 is in communication with the filter water introducing/washing water discharging second water flow portion 6 for collecting the filtered water or for passing the washing water (which may be crude water and will be simply referred to as washing water). The cover 9 is detachably mounted on the horizontal drum 3 by bolts and nuts 12 or the like.

Figure 4:
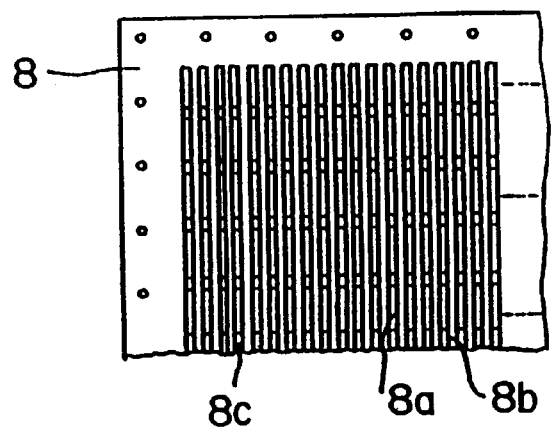
FIG. 4 is a partially enlarged plan view showing a planar filter mesh according to the invention.
Figure 6:
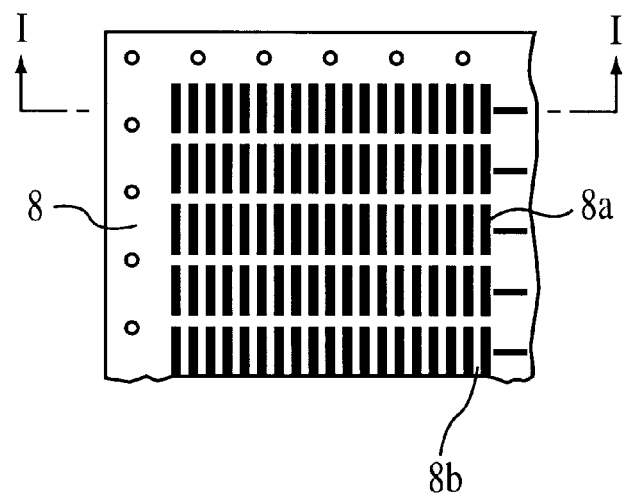
FIG. 6 is a partially enlarged plan view showing the filter mesh according to another embodiment of the invention.
Figure 7:
FIG. 7 is a cross-sectional view taken along the line A—A of FIG. 6 according to the present invention.
Figure 8:
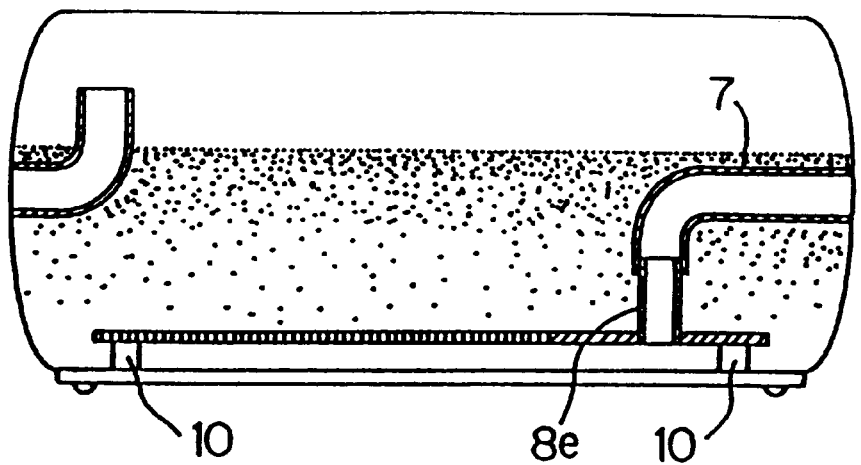
FIG. 8 is an enlarged plan view of the device where the planar filter mesh is mounted on the back surface of the cover according to the present invention.
Figure 9A:
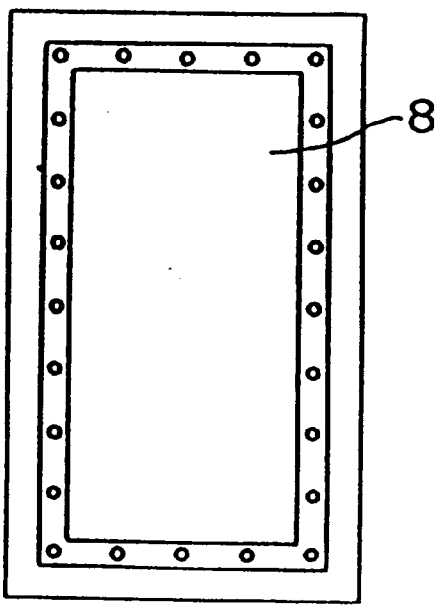
FIGS. 9(a) and 9(b) are a cross-sectional view taken along the line A—A of FIG. 8 according to the present invention.
Figure 9B:
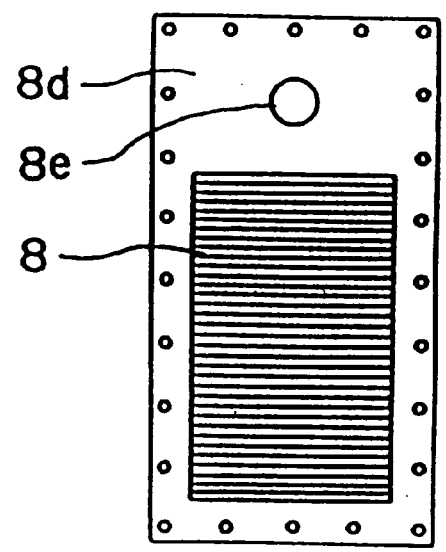

The case where substantially planar filter mesh 8 provided on almost all the surface of the back surface of the cover is provided along the overall length of the horizontal drum 3 will be described with reference to FIGS. 8 and 9. As shown in FIG. 9(a), the mesh 8 is replaceably mounted to substantially all the central surface of the back surface of the cover, preferably, through the member or flange 10 at the right and left and upper and lower edges of a wedge wire by bolts and nuts. Also, as shown in FIG. 9(b), slits 8c to be described later are formed at parts of the wedge wire 8. Also, the portion 8d where no slits 8c are formed is provided. A short pipe 8e is mounted on the portion 8d by welding or the like. As shown in FIG. 8, the short pipe 8e is engaged with the filter water introducing/washing water discharging second water flow pipe 7, so that the cover may be detachably mounted. The joint portion may be formed as pipes each having a taper. A recess is formed in one of the pipes for a packing such as an O-ring or the like. The packing may be provided to the recess in the joint portion. Although not shown, the cover 9 may be provided in the upper portion of the horizontal drum 3, and the filter mesh 8 may be detachably provided through the member or flange provided along the overall width of the lower portion of the horizontal drum 3 or at a part thereof drum 3, by bolts and nuts and the press-engagement to the grooves formed in the drum inner wall. Also, as shown in FIG. 4, preferably, the filter mesh 8 is a wedge wire which is composed of a number of slits 8c, . . . formed by slits 8a, . . . , and 8b in the planar plate. Furthermore, as shown in FIGS. 6 and 7, the mesh 8 may be composed of recesses 8'c depressed alternatively and the slits 8a, . . . , and 8b. The gap between the recesses 8'c and the lower planar surface is preferably smaller than a diameter of the desired filter material. As shown in FIG. 3, the cover and the filter mesh 8 of the wedge wire provided on the inner surface of the cover may be identical with the curved surface of the horizontal drum 3. Since there is no problem in function even if only the filter mesh 8 is flat or planar, the curved surface and the flat or planar surface will hereinafter be referred to as a substantially flat surface according to the present invention.

Figure 5:
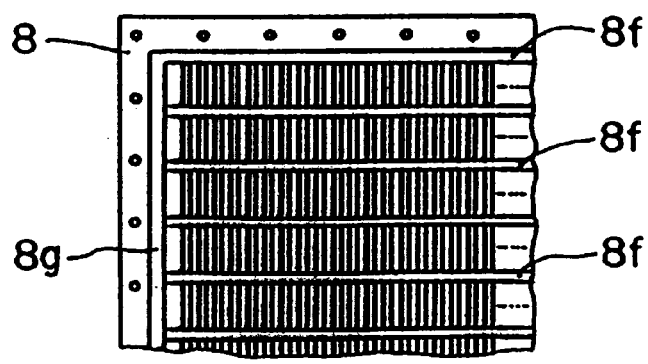
FIG. 5 is a partially enlarged plan view showing a back surface of the mesh shown in FIG. 4.

Incidentally, as shown in FIG. 5, reinforcement beams 8f are provided at a desired interval in a direction perpendicular to the direction of the slits in the back surface of the filter mesh 8 of the wedge wire. It is also preferable to provide reinforcement beam 8g in the direction of the slits so as to stand the weight of the filter material and the water.

Incidentally, the horizontal drum 3 may be formed integrally of a cylindrical portion and opposite end cover portions made of iron by welding or may be formed by molding the cover portions and bottomed cylindrical portions made of synthetic resin and adhering those components.

Also, the horizontal drum 3 and the crude water introducing/dirty water discharging first water flow pipe 5 are engaged with each other at a bearing 16 through a dust seal 14, a grand packing 15 or the like. The bearing 16 and the end wall of the horizontal drum 3 are fixed to each other. A gear sprocket 17 provided with the bearing 16 is driven by the drive force of the motor 18 (may be driven by a pulley and belt drive). The horizontal drum 3 is rotatably supported by three cam followers (spherical outer races) 21 mounted at an angular interval of 120° on the support frame 20 of the base 19. Furthermore, the filter water introducing/washing water discharging second water flow portion 6 in communication with the filter mesh 8 is located within the filter tank 1. The filter water introducing/washing water discharging pipe 7 in communication with the filter water introducing/washing water discharging second water flow portion 6 is integrally formed with a bearing 22 at the other end or the horizontal drum 3. The horizontal drum 3 is rotatably supported by the bearing 22 and three cam followers (spherical outer races) 23, mounted at an angular interval of 120°, on the support frame 20 of the base 19.

Incidentally, a cam (not shown) is located at a desired position of the horizontal drum 3 so that the filter water introducing/washing water discharging second water flow portion 6 in communication through the filter mesh 8 is positioned in the bottom portion. The rotation of the horizontal drum 3 is stopped by a cam switch that may come into contact with the cam so that the filter water introducing/washing water discharging second water flow portion 6 is positioned in the bottom portion. The structure may be modified, so that it is possible to stop the rotation of the horizontal drum 3 by detecting, with a sensor (not shown), the position where the filter water introducing/washing water discharging second water flow portion 6 is positioned in the bottom portion or by detecting, with a sensor (not shown), an angular position of the rotating bearings or the like so that the filter water introducing/washing water discharging second water flow portion 6 is located in the bottom portion.

Incidentally, the bearing 22 and the stationary pipe 24 which is not rotated and which is in communication with the filter water introducing/washing water discharging second water flow pipe 7 are mounted through a dust seal, a grand packing 15, a grand retainer and the like. Also, the valve control 25 is mounted on the pipe for selectively supplying the crude water and washing water to be described later to the interior of the horizontal drum 3. Reference numeral 26 designates a crude water inlet, 27 designates a processed water outlet, and 28 designates a water discharging outlet.

Figure 10:
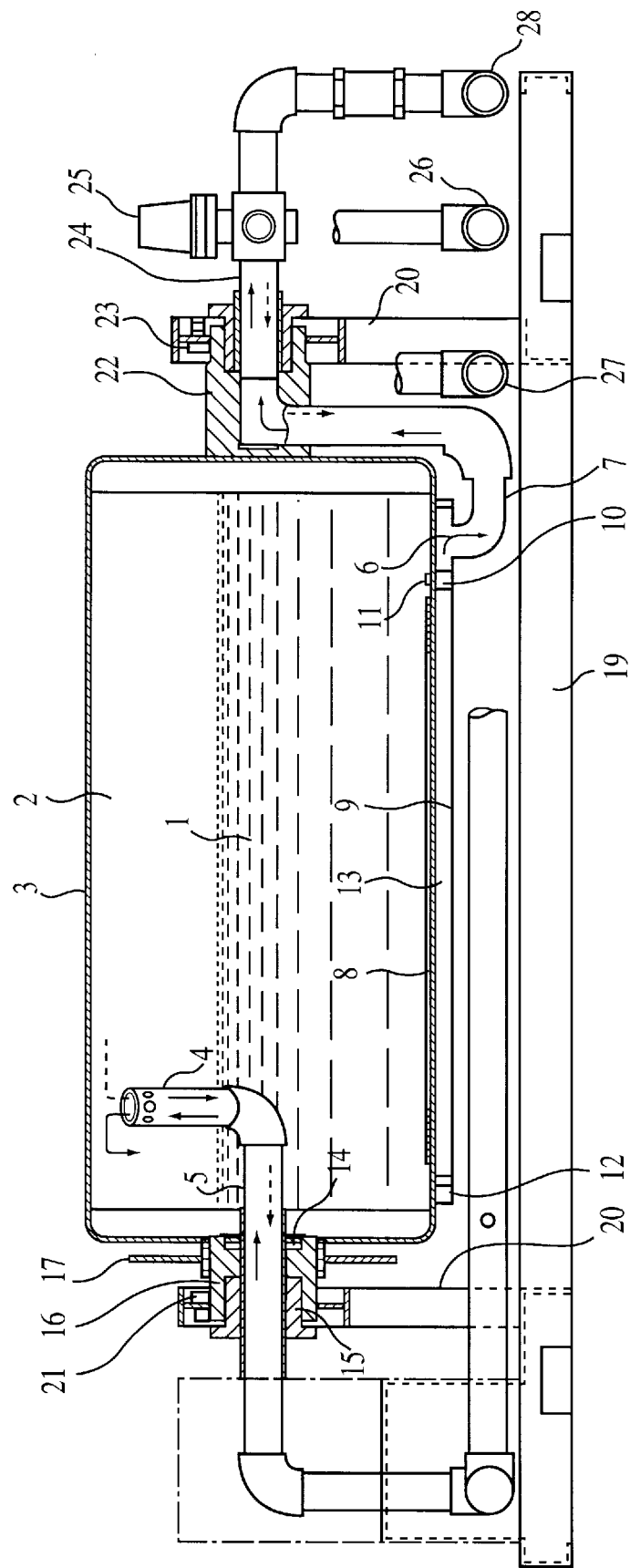
FIG. 10 is a longitudinal sectional view showing a filtering device according to a second embodiment of the invention.
Figure 11:
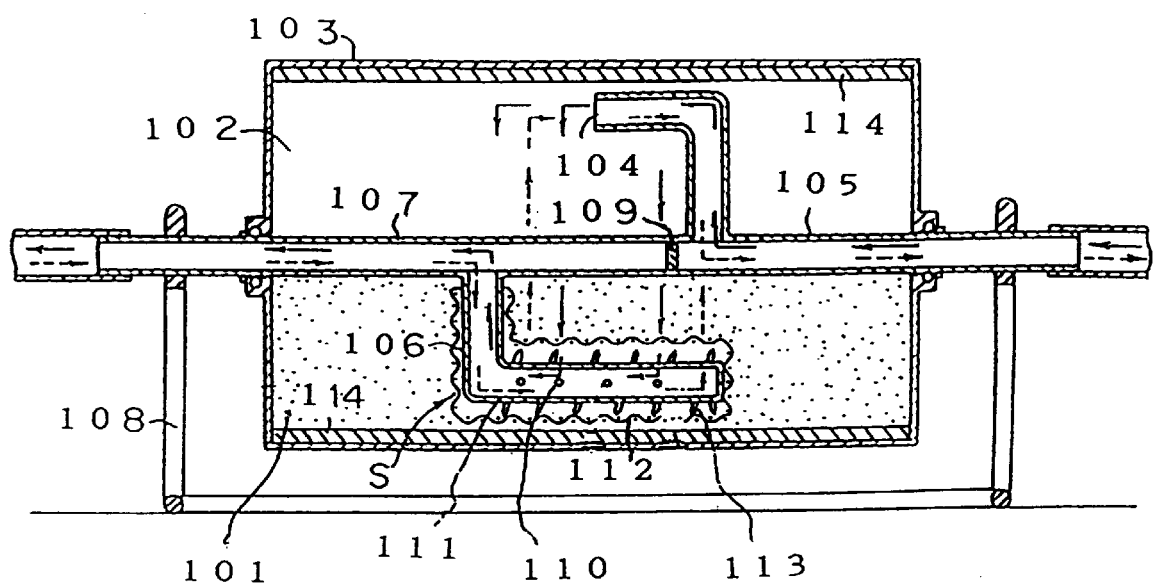
FIG. 11 is a longitudinal sectional view showing a conventional filtering device.

Also, in the foregoing embodiment, the filter water introducing/washing water discharging second water flow pipe 7 in communication with the filter water introducing/washing water discharging second water flow portion 6 is arranged in the interior of the horizontal drum 3. It is however possible to arrange the filter water introducing/washing water discharging second water flow pipe 7 outside of the horizontal drum 3 as shown in FIG. 10 so as to increase the space of the filter tank and to prevent the filter water introducing/washing water discharging second water flow pipe 7 from abutting against the filter layer. Then, the substantially planar filter mesh 8 is provided on the substantially overall surface in the lengthwise and widthwise directions of the horizontal drum 3. Accordingly, it is possible to further enhance the filtering efficiency. Also, as shown in FIG. 10, a plug or the like may be provided at the end of the crude water introducing/dirty water discharging first water flow portion 4 located within the space portion 2 so as to disperse the water from the side walls thereof. It is also possible to provide the crude water introducing/dirty water discharging first water flow portion 4 over the full length and width of the horizontal drum 3. Thus, it is possible to further enhance the filtering efficiency.

Furthermore, if the rotation of the horizontal drum 3 may be modified to the swing motion, the filter mesh 8 is preferably provided in the central portion of the interior of the horizontal drum 3, and the filter water introducing/washing water discharging second flow pipe 7 is arranged outside of the horizontal drum 3, it is possible to miniaturize the drum 3 and to operate the drum by a small force. The swing motion may be attained by the forward and reverse rotation of the motor 18 or by, for example, using a reciprocating rack and a pinion (not shown) mounted on the horizontal drum 3.

Incidentally, in any position of the horizontal drum 3 or of the cover, it is possible to provide an inspection window through which the operator may observe the interior. Also, as shown in FIG. 2, the overall structure of the filtering device is covered by a roof cover 30 so that the device is portable.

Then, in the filtering device, as shown in the solid arrows in FIG. 1, the crude water is discharged from the processed water outlet 28 through the crude water inlet 26, the pipe 29, the first water flow pipe 5, the first water flow portion 4, the space portion 2, the surface of the filter layer, the filter layer 1, the substantially planar filter mesh 8, the second water flow portion 6 and the second water flow pipe 7. The filtering and washing effect of the filtering device will now be described. The washing water (which may be crude water) is continuously introduced, as indicated by dotted line arrows into the drum 3 from the second water flow pipe 7 by the operation of the pump (not shown) or the like. At the same time, the drum 3 is driven by drive means 17 to 19 or the like. As a result, the drum 3 is rotated so that the drum exceeds a stable angle. As a result, the granular filter material within the filter layer 1 is crumbled or collapsed. The granular filter material is smashed and rubbed. The adhered dirty components of the granular filter material are separated. The granular filter material is rubbed also with the substantially planar filter mesh 8 provided within the drum 3. Since the adhered dirty components of the substantially planar filter mesh 8 are separated, it is possible to attain the washing with a small amount of washing water particularly in comparison with the conventional filtering device. These separated adhesive dirty components are discharged from the water discharging outlet 27 to the outside through the crude water inlet 26, the second water flow pipe 7, the second water flow portion 6, the substantially planar filter mesh 8 of the second water flow portion 6, the filter layer 1, the filter surface, the space portion 2, the first water flow portion 4 and the first water flow pipe 5. Accordingly, the filter material washing of the filtering device is substantially completely performed by the synergistic effect of the separation of the adhesive dirty components of the substantially planar filter mesh by rubbing the granular filter material with the substantially planar filter mesh provided within the drum 3, the separation of the adhesive dirty components of the granular filter material by rutting the granular filter material per se, and the water flow of the washing water from the second water flow portion 6 within the filter layer 1.

Subsequently, how to operate the agitating device according to the foregoing embodiments will be described. In the case where the device is used as a regular filtering device for a predetermined period of time for reverse washing of the filter material, the horizontal drum is rotated by the drive means so that the filter material is collapsed from the inner circumferential surface of the drum, and the filtering material is forcibly rubbed together and is forcibly rubbed with the filter material to thereby separate the adhesive dirty components. Also, in order to replace the filter meshes, in case of the filter mesh to be mounted on the back surface of the cover, if the rotation of the horizontal drum is stopped at the position where the cover may readily be removed and the filter material is located except for the position of the cover, it is easy to remove the cover without a fear that the filter material would fall. The replacement of the meshes may readily be performed.

Figure 12:
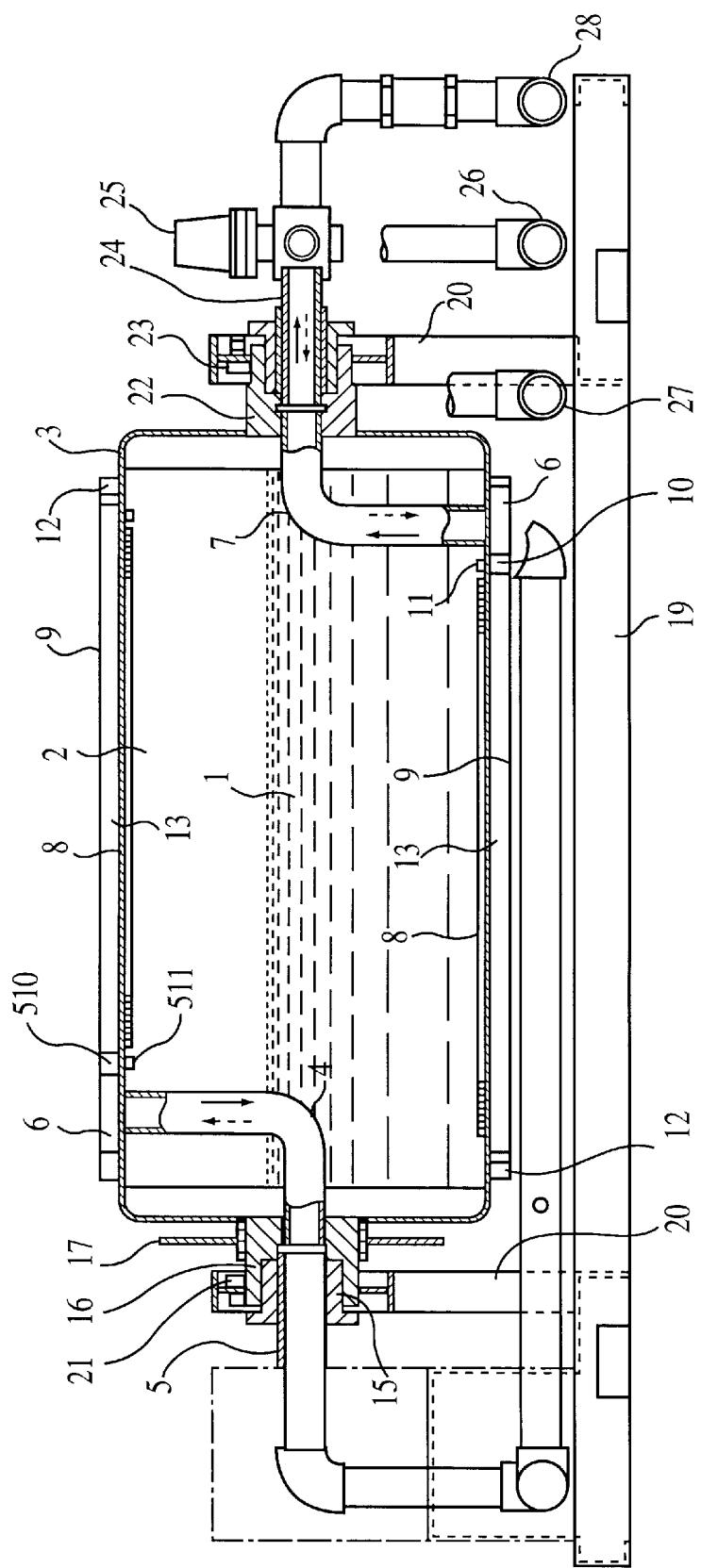
FIG. 12 is a longitudinal sectional view showing a filtering device according to a third embodiment of the invention.

The means for cleaning the back surface of the filter mesh of the filtering device according to the present invention and for preventing the adhesive substance such as an alga or seaweed will now be described with reference to the drawings. In contrast to the filtering device shown in FIGS. 1 to 3, as shown in FIG. 12, in the crude water introducing/dirty water discharging first water flow pipe 5 having the crude water introducing/dirty water discharging first water flow portion 4 located within the space portion 2, the filter mesh 8 which may be selected from various kinds of planar members such as a metal mesh, a porous plate made of metal or synthetic resin is fixed to the crude water introducing/ dirty water discharging first water flow portion 4 directly within the filter tank 1 of the horizontal drum 3 or to the flange or the like by adhesives or welds. Alternatively, more preferably, the mesh is fixed to almost all the inner surface of the cover 9 through a rectangular frame member or a flange 510 provided at four corner portions of the cover by welding or the like. Alternatively, the mesh may be detachably mounted on the inner surface of the cover 9 or within the filter tank 1 by bolts and nuts 511. It is also possible to provide auxiliary filtering means in the crude water introducing/dirty water discharging portion.

It is natural that also in this filtering device, the cleaning means for the back surface of the filter mesh to be described later and the means for preventing the alga or seaweed from adhering to the back surface are provided.

The means for cleaning the back surface of the filter mesh and preventing the adhesives such as alga or seaweed from adhering to back surface which means follows the rotation of the drum is provided between the planar filter mesh 8 and the inner wall of the drum 3. As shown in FIGS. 14 to 18, preferably, a number of brushes 532 made of synthetic resin or metal are implanted in a single plate 531 made of metal or synthetic resin. Alternatively, bearing pipes 535 is symmetrically welded or adhered to opposite plates 534 made of metal or synthetic resin through a connecting rod 533, a pair of rotary shafts 537 made of synthetic resin or metal and having brush portions made of synthetic resin or metal are inserted at both ends. Preferably, the shafts of the rotary brushes are flexible and both ends of each of the shafts are bent and inserted into inner diameter portions 538 of the bearing pipes 535. Also, the means for cleaning the back surface of the filter mesh and preventing the adhesives such as alga or seaweed from adhering to back surface may preferably be a number of ingot into which polishing agents are mixed into together with foaming agents. It is preferable that the shape of the ingots is spherical. However, it is possible to use the ingots having corrugations on the spherical shape. The ingots may take a cubic or polygonal shape. Also, the material may be metal, ceramics, scrubbing brushes or the like. The brush will be simply referred to as a number of sliding ingots. More preferably, all the above-described means for cleaning the back surface of the filter mesh and preventing the adhesives such as alga or seaweed from adhering to back surface is made of material such as synthetic resin, and is coated with or mixed with the dust preventing agent. As a result, it is possible to prevent the adhesion of the adhesive substance such as an alga or seaweed to the adhesive substance preventing means even if the filtering device is used for a long period of time. It is possible to provide the clean filtering device which is easy to perform the maintenance work without degrading the filtering efficiency. These dust preventing agents may be selected from the substances having a high safety aspect, such as "trademark: Syabendasol, T, B, Z (made by US Merck), chemical name: 2(4-thiazolilbenzmidazol)", or "trademark: Binazin (made by US Bentron), chemical name: 10, 10 oxiphenoxilalsin", "trademark: Nobcoside N-96 (made by US Sunnobuco), and the like. The coating agents may be selected from one or more of germicides composed of chlorhexyzine and silver halide and may be a composition in which a microperticle metal copper and rosin system resin are dispersed in the adsorbent made of cellulose system high molecular substance. In summary, it is only necessary to mix or coat the material to the adhesive preventing means so as to prevent the adhesion of the alga or seaweed to the adhesive preventing means. Accordingly, the material is not limited to the above-enumerated substances. Accordingly, the dust preventing agents will be simply expressed as the mixture or coating agents in the present invention. It is also preferable to mix or coat the like dust preventing agent to the planar filter mesh.

The dimension of the width of each brush may be determined so that two or three above-described brushes may be provided for the overall width of the filter mesh. Alternatively, the brushes 532, . . . may be implanted in both sides of the plate 531, and the surface thereof in contact with the drum 3 may be formed in conformity with the shape of the drum. Also, the diameter of the rotary brushes or the width of the planar brush may be selected such a dimension that the brushes may be freely moved between the filter mesh and the inner wall of the drum. Furthermore, the substantially planar filter mesh may be made of synthetic resin such as polypropylene which contains the dust preventing agent. In the case where the mesh is mounted on the cover, the cover may be also made of synthetic resin which contains the dust preventing. If this cover is made of transparent material, it is possible to inspect the interior. Also, if the filter mesh or cover is made of metal, the filter mesh may be coated with the dust preventing agents.

Incidentally, a cam (not shown) is located at a desired position of the horizontal drum 3 so that the filter water introducing/washing water discharging second water flow portion 6 in communication through the filter mesh 8 is positioned in the bottom portion. The rotation of the horizontal drum 3 is stopped by a cam switch that may come into contact with the cam so that the filter water introducing/ washing water discharging second water flow portion 6 is positioned in the bottom portion. The structure may be modified, so that it is possible to stop the rotation of the horizontal drum 3 by detecting, with a sensor (not shown), the position where the filter water introducing/washing water discharging second water flow portion 6 is positioned in the bottom portion or by detecting, with a sensor (not shown), an angular position of the rotating bearings or the like so that the filter water introducing/washing water discharging second water flow portion 6 is located in the bottom portion.

Incidentally, the bearing 22 and the stationary pipe 24 which is not rotated and which is in communication with the filter water introducing/washing water discharging second water flow pipe 7 are mounted through a dust seal, a grand packing 15, a grand retainer and the like. Also, the valve control 25 is mounted on the pipe for selectively supplying the crude water and washing water to be described later to the interior of the horizontal drum 3. Reference numeral 26 designates a crude water inlet, 27 designates a processed water outlet, and 28 designates a water discharging outlet.

Figure 13:
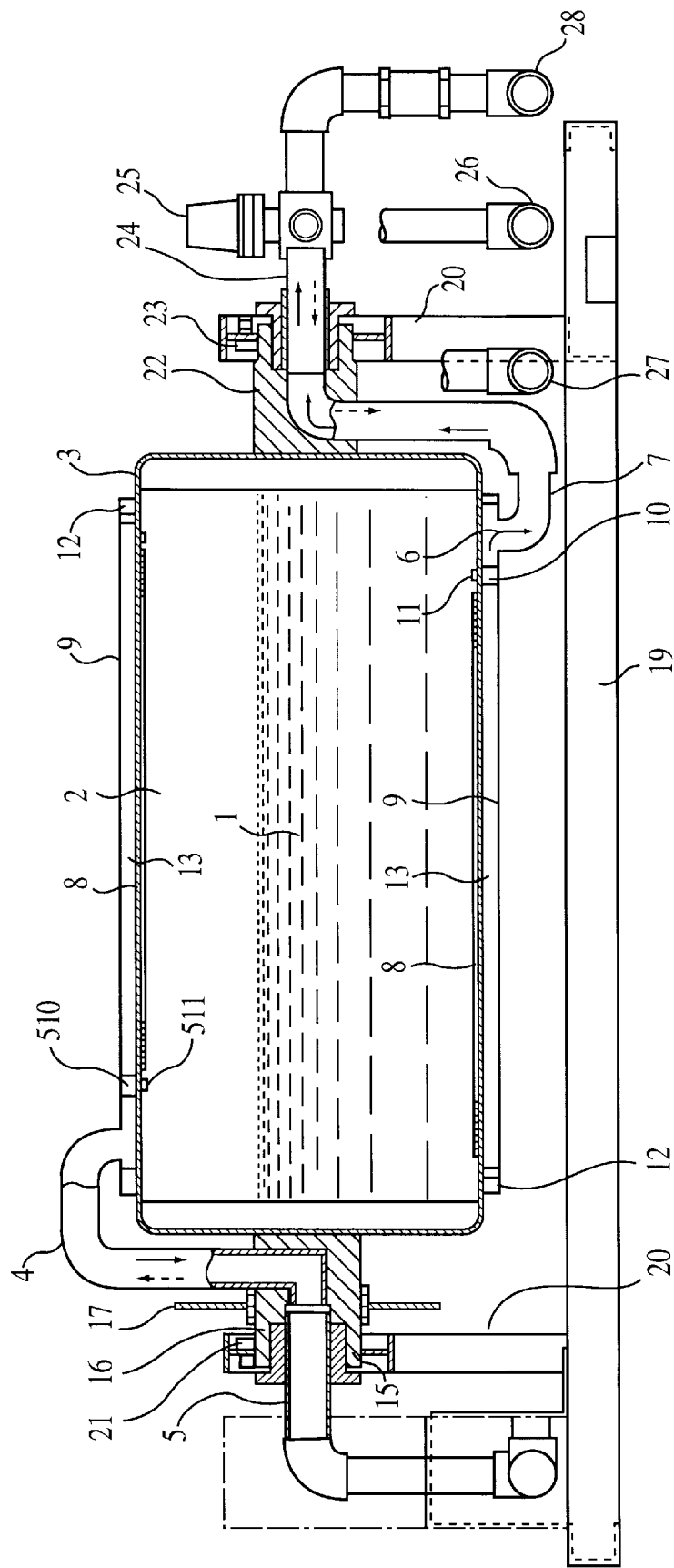
FIG. 13 is a longitudinal sectional view showing a filtering device according to a fourth embodiment of the invention.
Figure 14:
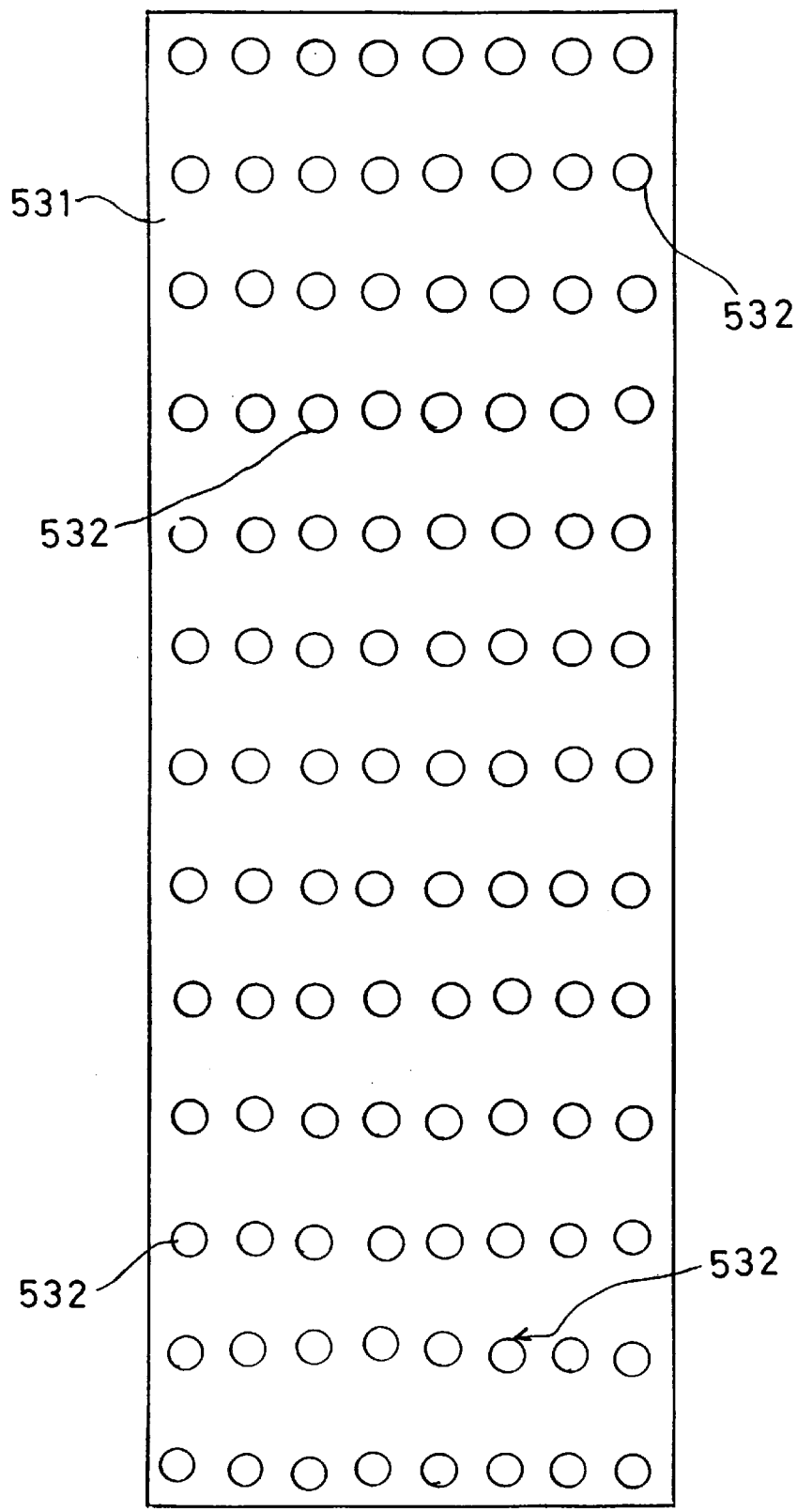
FIG. 14 is a plan view showing an embodiment of an adhesive preventing means for an alga or seaweed and for washing a back surface of a filter mesh according to the present invention.
Figure 15:
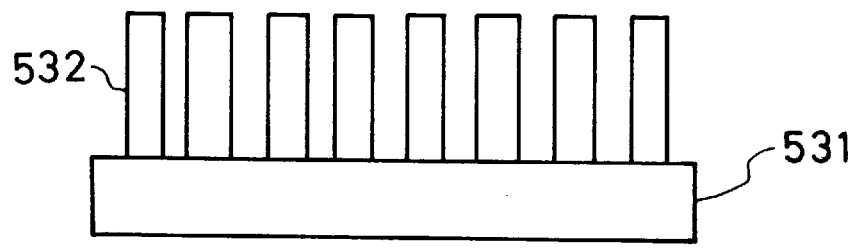
FIG. 15 is a side elevational view of the means shown in FIG. 14.
Figure 16:
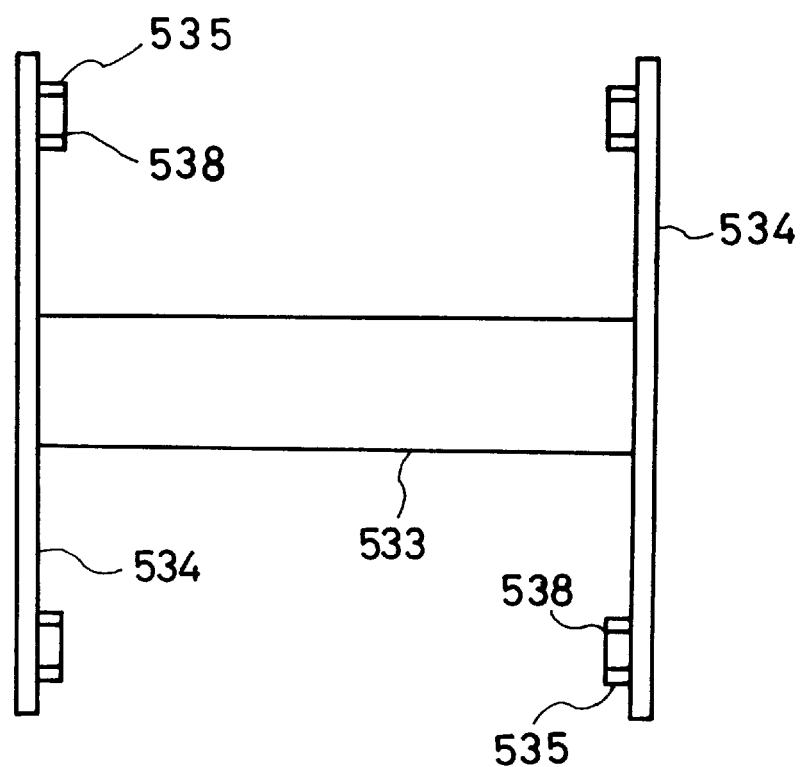
FIG. 16 is a plan view showing another embodiment of an adhesive preventing means for an alga or seaweed and for washing a back surface of a filter mesh according to the present invention.
Figure 17:
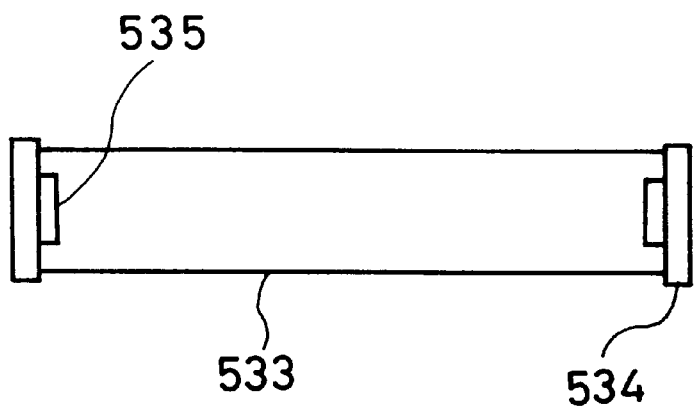
FIG. 17 is a side elevational view of the means shown in FIG. 16.
Figure 18:
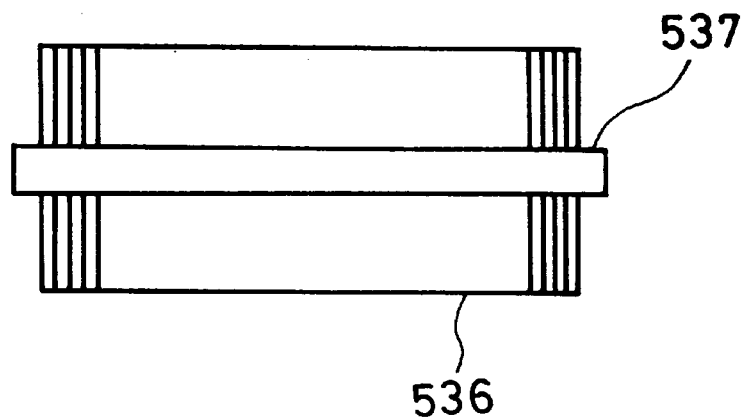
FIG. 18 is a side elevational view of a brush used in the embodiment shown in FIG. 16.

Also, as shown in FIG. 10, it is possible to disperse the water from the side alls of the first water flow portion, and it is also possible to provide the crude water introducing/ dirty water discharging first water flow portion 4 over the full length and width of the horizontal drum 3. In this case, it is possible to provide an auxiliary filter means in the crude water introducing/dirty water discharging first water flow portion 4 as shown in FIG. 12. in the same way as the case shown in FIG. 10 where the filtered water introducing/ washing water discharging second water flow pipe 7 is arranged in the outside of the horizontal drum 3, it is possible to arrange the first water flow portion 4 outside of the horizontal drum 3 as shown in FIG. 13. Thus, it is possible to further enhance the filtering efficiency.

Subsequently, how to operate the agitating device according to the foregoing embodiments will be described. In the case where the device is used as a regular filtering device for a predetermined period of time for reverse washing of the filter material, the horizontal drum is rotated by the drive means so that the filter material is collapsed from the inner circumferential surface of the drum, and the filtering material is forcibly rubbed together and is forcibly rubbed with the filter material to thereby separate the adhesive dirty components. Also, in order to replace the filter meshes, in case of the filter mesh to be mounted on the back surface of the cover, if the rotation of the horizontal drum is stopped at the position where the cover may readily be removed and the filter material is located except for the position of the cover, it is easy to remove the cover without a fear that the filter material would fall. The replacement of the meshes may readily be performed. Only to meet the requirement that the filter mesh cleaning and adhesive preventing means which may follows the rotation of the drum between the planar filter mesh and the inner wall of the drum is provided and preferably a number of brushes are provided on a single plate, or at least one rotary brush is provided on the opposite plates, or a number of sliding ingots are inserted into the space between the filter mesh and the inner wall of the drum, the brushes or the like are slidingly moved along and on the back surface of the filter mesh and the brushes or like may prevent the dirt and the adhesives such as alga or seaweed from adhering the mesh of course during the filtering operation and in accordance with the rotation of the drum in the reverse washing. Even if the dirt or the like may be adhered to the brush, the dirt may be separated. The dirt may be automatically discharged to the outside together with the water.

First, since the filter mesh area is increased, the filter efficiency is enhanced, and the horizontal drum is rotated during the reverse washing operation, the filter material is sliding rubbed together so that there is no strain. In spite of the fact, it is possible to break the dirt or dirty matters adhered to the filter mesh by the movement of the filter material and to separate the dirt away from the filter mesh. in comparison with the conventional stationary type filtering device, the washing water may be saved by about one tenth of that for the conventional filtering device, and at the same time, it is possible to wash the filter mesh for a short period of time.

Second, in addition to the first effect, since the filter mesh is provided between the filter layer and the space portion, the synergetic effect of the rough filtering through the space portion, and the filtering through the filter layer where the filtering effect in the space portion could not sufficiently be performed may be obtained. The filtering efficiency is enhanced. It is possible to provide a filtering device in which during the washing operation, the adhesives may automatically be washed out.

Third, in addition to the first and/or second effect, since at least one of the crude water introducing/dirty water discharging water flow pipe and the filtered water introducing/ washing water discharging second water flow pipe is arranged outside of the horizontal drum, the dead space is not formed within the drum, and a part or all of the one may become the filter layer. Thus, it is possible to make the horizontal drum to such an extent.

Fourth, in addition to any one of the foregoing first to third effects, since the filter mesh may readily be replaced by new one, the application of the filter mesh in response to the degree of contamination or cleanliness of the filter mesh or the repair of the mesh may readily be attained.

Fifth, in addition to any one of the foregoing first to fourth effects, since the filter mesh is provided on the inner surface of the cover and may be replaced together with the cover, it is easy for any one to replace the filter meshes with great ease. The application of the filter mesh in response to the degree of contamination or cleanliness of the filter mesh or the repair of the mesh may more readily be attained.

Sixth, in addition to any one of the foregoing first to fifth effects, since the filter mesh is composed of a wedge wire, the dirty matters collected by the mesh may readily be substantially completely removed without damaging the granular filter material and the sliding rubbing between the inner wall of the drum and the granular filter material may smoothly be performed.

Seventh, in addition to any one of the foregoing first to sixth effects, since the rotational manner of the horizontal drum may be of a swing motion type, the drum is swung in the range where the filter material and the filter mesh are rubbed with each other. It is possible to remove the dirty substance without any difficulty. This leads to the saving of the drive power.

Eighth, in addition to any one of the foregoing first to seventh effects, since the filtering device has a dirt adhesion preventing device for the alga or seaweed and a self-cleaning function for the back surface of the filter mesh even during the filtering operation between the planar filter mesh and the inner wall of the drum, the self-cleaning function and the alga or seaweed adhesive preventing function are available to prevent the dirt or alga from adhering to the back surface of the filter mesh through the sliding movement in accordance with the rotation of the drum. Even if the dirt or the like adheres to the back surface, the dirt is removed so that the dirt may be automatically discharged together with the washing water to the outside.

Ninth to eleventh, in addition to any one of the foregoing first to eighth effects, the filtering device has a simple back surface self-washing structure which may prevent the alga or seaweed from adhering to the back surface to thereby prevent the generation of mold. Even if the dirt or the like adheres to the back surface, the dirt or the like may be removed.

Twelfth, in addition to any one of the foregoing first to eleventh effects, since the adhesive preventing means is mixed or coated with the dust preventing agents, the filtering device always may keep in a clean condition.

Thirteenth, in addition to any one of the foregoing first to twelfth effects, only by mixing or coating the dust preventing agents to the filter mesh, it is possible to provide a filtering device which may dispense with the cleaning of the back surface of the filter mesh for a long period of time and may remove the means for preventing the alga or seaweed from adhering to the back surface in a more positive manner.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claimed is:

1. A filtering device comprising:
    a horizontal drum in which a filter layer made of granular filter material and a space portion are formed in a vertical direction within its interior;
    a crude water introducing/dirty water discharging first water flow pipe which passes through an axial portion of said horizontal drum from the outside of said horizontal drum and wherein said first water flow pipe includes a first water flow portion which is located in the space portion; and
    a filtered water introducing/washing water discharging second water flow pipe which passes through an axial portion of said horizontal drum from the outside of said horizontal drum and wherein said second water flow pipe includes a second water flow portion which is located in an interior of the filter layer;
    wherein a planar filter mesh which is rotated together with said horizontal drum and which is in communication with said second water flow portion is additionally provided in the interior of said filter layer.

2. A filtering device comprising:
    a horizontal drum in which a filter layer made of granular filter material and a space portion are formed in a vertical direction within its interior;
    a crude water introducing/dirty water discharging first water flow pipe which passes from an axial portion of said horizontal drum from the outside of said horizontal drum and wherein said first water flow pipe includes a first water flow portion which is located in the space portion; and
    a filtered water introducing/washing water discharging second water flow pipe which passes through an axial portion of said horizontal drum from the outside of said horizontal drum and wherein said second water flow pipe includes a second water flow portion which is located in an interior of the filter layer;
    wherein a planar filter mesh which is rotated together with said horizontal drum and which is in communication with said filtered water introducing/washing water discharging second water flow portion is additionally provided in the interior of said filter layer and in the space portion, and a planar filter mesh which is in communication with said crude water introducing/washing water discharging first water flow pipe is additionally provided in said space portion.

3. The filtering device according to claim 1, wherein at least one of said crude water introducing/dirty water discharging first water pipe and said filtered water introducing/washing water discharging second water pipe is arranged outside of said horizontal drum and at least one of said crude water introducing/dirty water discharging first water flow portion which is located within said filter layer through a pipe and said filtered water introducing/washing water discharging second water flow portion is in communication with each other.

4. The filtering device according to claim 1, wherein said planar filter mesh is detachably mounted on the horizontal drum.

5. The filtering device according to claim 1, wherein said planar filter mesh is provided on an inner surface of a cover and detachably mounted together with the cover.

6. The filtering device according to claim 1, wherein said filter mesh comprises a wedge wire composed of a number of slits formed in the substantially planar plate.

7. The filtering device according to claim 1, wherein a rotation of said horizontal drum of said filtering device is made into a swing motion.

8. The filtering device according to claim 1, further comprising a means for cleaning a back surface of the filter mesh and for preventing adhesives such as an alga or seaweed from adhering to the back surface, said means following the rotation of the drum and provided between said filter mesh and an inner wall of said drum.

9. The filtering device according to claim 8, wherein said means for cleaning a back surface of the filter mesh and for preventing adhesives such as an alga or seaweed from adhering to the back surface comprises a number of brushes implanted in a single plate.

10. The filtering device according to claim 8, wherein said means for cleaning a back surface of the filter mesh and for preventing adhesives such as an alga or seaweed from adhering to the back surface comprises at least one rotary brush.

11. The filtering device according to claim 8, wherein said means for cleaning a back surface of the filter mesh and for preventing adhesives such as an alga or seaweed from adhering to the back surface comprises a number of sliding ingots.

12. The filtering device according to claim 8, wherein said means for cleaning a back surface of the filter mesh and for preventing adhesives such as an alga or seaweed from adhering to the back surface has a mixture of a dust preventing agent and a coating of said dust prevent agent.

13. The filtering device according to claim 1, wherein the dust preventing agents are mixed or coated with said planar filter mesh.

14. The filtering device according to claim 2, wherein at least one of said crude water introducing/dirty water discharging first water pipe (5) and said filtered water introducing/washing water discharging second water pipe (7) is arranged outside of said horizontal drum (3), and at least one of said crude water introducing/dirty water discharging first water flow portion (4) which is located within said filter layer (1) through a pipe and said filtered water introducing/washing water discharging second water flow portion (6) is in communication with each other.

15. The filtering device according to claim 2, wherein said planar filter mesh (8) is detachably mounted on the horizontal drum (3).

16. The filtering device according to claim 2, wherein said planar filter mesh (8) is provided on an inner surface of a cover and detachably mounted together with the cover.

17. The filtering device according to claim 2, wherein said filter mesh (8) comprises a wedge wire composed of a number of slits (8*c*) formed in the substantially planar plate by slits (8*a*) and (8*b*).

18. The filtering device according to claim 2, wherein a rotation of said horizontal drum (3) of said filtering device is made into a swing motion.

19. The filtering device according to claim 2, further comprising a means for cleaning a back surface of the filter mesh and for preventing adhesives such as an alga or seaweed from adhering to the back surface, said means following the rotation of the drum and provided between said filter mesh (8) and an inner wall of said drum (3).

20. The filtering device according to claim 12, wherein the dust preventing agents are mixed or coated with said planar filter mesh (8).

\* \* \* \* \*